Figure 1:
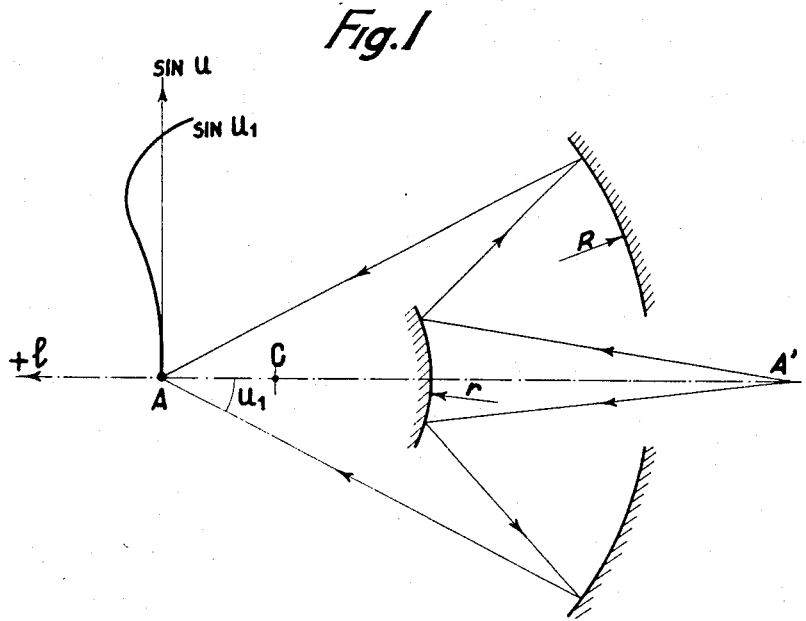

Dec. 15, 1959   G. NOMARSKI ET AL   2,916,966
CATADIOPTRIC OBJECTIVES

Filed May 31, 1956   6 Sheets-Sheet 1

GEORGES NOMARSKI and
PIERRE ROUSSEAU

BY: *Allen & Allen*
ATTORNEYS

GEORGES NOMARSKI and
PIERRE ROUSSEAU

BY: Allen & Allen
ATTORNEYS

Dec. 15, 1959   G. NOMARSKI ET AL   2,916,966
CATADIOPTRIC OBJECTIVES

Filed May 31, 1956   6 Sheets-Sheet 3

GEORGES NOMARSKI and
PIERRE ROUSSEAU

BY: Allen & Allen
ATTORNEYS

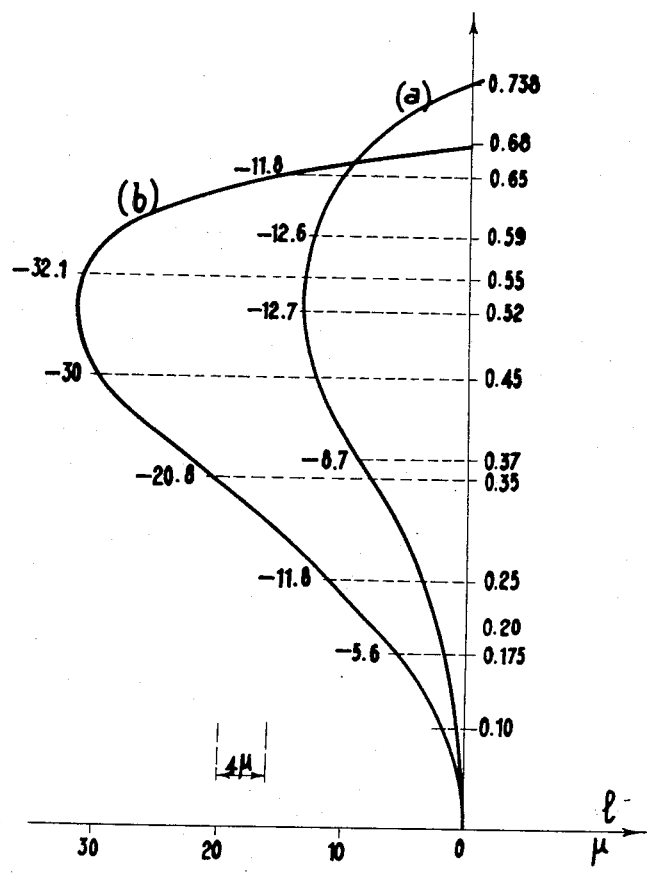

GEORGES NOMARSKI and
PIERRE ROUSSEAU

BY: Allen & Allen
ATTORNEYS

United States Patent Office 2,916,966
Patented Dec. 15, 1959

2,916,966

CATADIOPTRIC OBJECTIVES

Georges Nomarski, Paris, and Pierre Rousseau, Poissy, France, assignors to Centre National de la Recherche Scientifique, Paris, France, a corporation of France Application May 31, 1956, Serial No. 588,538

Claims priority, application France June 3, 1955

7 Claims. (Cl. 88—57)

The invention has for its object means which enable the zonal spherical aberration of catadioptric systems to be reduced, and mainly the aberration of those systems constituted by two spherical mirrors arranged in the same way as in a Cassegrain telescope.

The invention consists in the use, in combination with a catoptric or catadioptric system, of a refractive element having a low power as compared with that of the said system, the said element being placed in front of the system between the object and the system itself.

The curve of spherical aberration of this element has a form such that, when it is combined with that of the catoptric system, the combination gives a resultant zonal spherical aberration less than that of the most carefully corrected objective of mirrors.

The invention is more particularly applicable to mirror objectives for microscopes, and especially to the devices described in the two French patent specifications Nos. 1,057,487 and 1,101,615.

In all cases, the additional element should have characteristics which are established as a function of the properties of the mirror system: this element should give a virtual image of the object with a magnification in the neighbourhood of +1, but exhibiting a spherical aberration having the desired shape in order that its errors should have substantially the same values as those of the system of mirrors, and this for values comprised between one-half and the maximum of the angle of aperture of the said system. In this way, the final image formed by the system of mirrors from the intermediate virtual image provided by the refractive element has a quality superior from the point of view of spherical aberration, to that obtained by means of mirror systems.

In other words, the additional refractive element is characterised by the fact that it is located between the object and the optical system of mirrors, that its power is low as compared with that of the optical system of mirrors, and that the form of its own curve of spherical aberration is such that when it is combined with the aberration of the mirror system, the zonal spherical aberration of the combined system is very substantially reduced.

The element employed may be such that its curve of spherical aberration is of the kind in which the slope does not pass through a reversal of sign or it may be an element in which the curve does have a reversal of slope, or "belly."

In the first case, the aberration of the non-corrected type is an under-correction and its form is adapted to that of the objective which is purposely over-corrected in such manner that the resultant curve changes its sign of slope twice in the zone of the useful angle of aperture.

In the second case, the curve of the corrected type has an over-corrected belly, the absolute value of which is roughly equal to that of the system of mirrors which, in this case, has been separately corrected. This also leads, in the optimum case, to a double reversal of sign of the resultant curve.

In both cases, the invention enables the effect of spherical aberration to be substantially reduced.

The desired results may be attained in a number of different ways. There exists, in fact, a number of very simple refractive systems which comply with the conditions stated above. By way of indication, and without the implication of any limitation, there will be described in the text which follows, three possible methods of carrying out the invention, with reference to a system of spherical mirrors of the Cassegrain-Schwarzschild type.

The main features of a system of this kind will first of all be recalled.

Two spherical mirrors are considered which have a common centre at the point C (see Fig. 1). The large concave mirror or principal mirror has a radius R (negative) and the small convex mirror or secondary mirror has a radius r (positive). The system is assumed to have been corrected for two conjugate points such as A and A'. It has the features of a magnification CA'/CA and its numerically maximum aperture sin U.

Its spherical aberration depends on the ratio of the radii of curvature $$K = \frac{-R}{r}$$

By numerical trials, it is easy to determine the values which lead to a reversal of sign of slope of the spherical aberration curve for an aperture in the neighbourhood of the maximum aperture.

It is also possible to use exact formulae, for example those recently established by one of the present applicants, and which give a relation between K and the principal parameters U and U' (where U' is the image aperture which corresponds to the object aperture U), this relation being verified when the focus corresponding to the aperture U coincides with the paraxial focus.

This relation is expressed as follows:

$$K^2 - 2K \frac{1 - \cos^2 \frac{U+U'}{2} \cos \frac{U-U'}{2}}{1 - \cos^2 \frac{U+U'}{2}} + 1 = 0$$

(reference Revue Optique, vol. 34, No. 1, 1955, pages 37 and 38.)

The optical quality of a system of this kind depends on the zonal spherical aberration 1 which is the maximum value of the curve 1 (sin U) of Fig. 1 (the belly of the curve). On the other hand, this quality depends on the ratio $f/\lambda$ where $f$ is the focal length of the system and $\lambda$ is the dominant wave length of the light employed.

It will now be shown that it is possible to reduce this zonal aberration by means of a very simple additional system placed in front of the system of mirrors which furthermore does not destroy the essential advantages of the mirror objectives.

Figure 6:
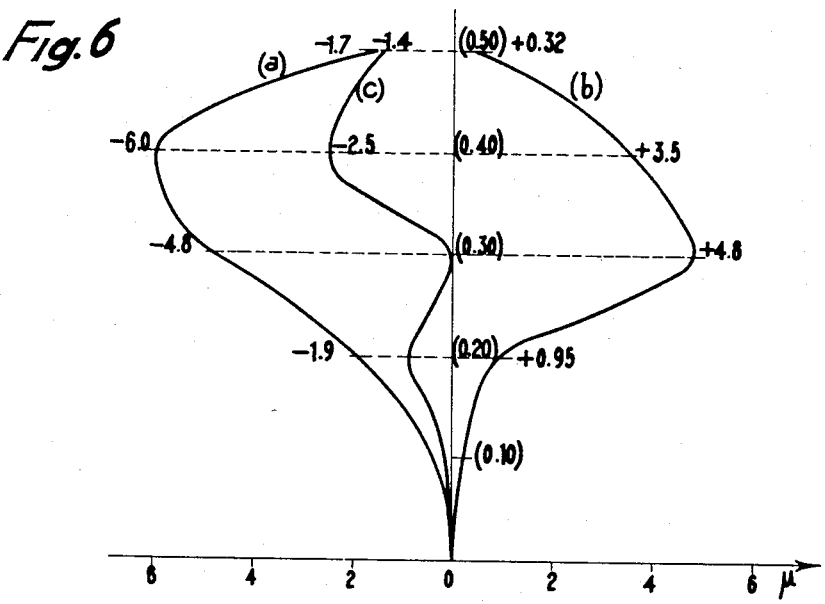
Figure 5:
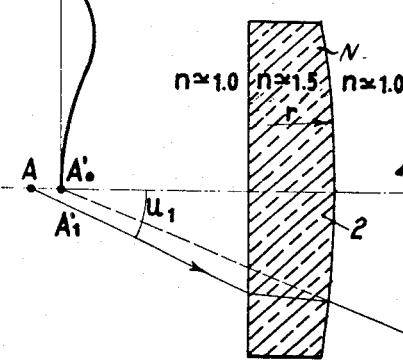
Figure 7:
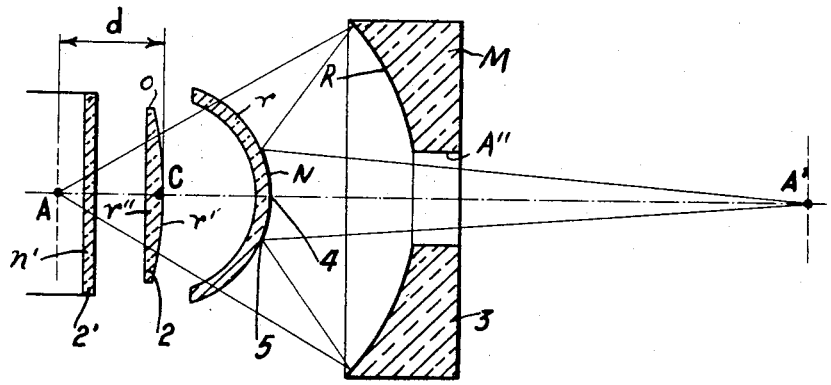

This demonstration will be made on three forms of embodiment given by way of example, reference being made to the attached drawings in which:

Fig. 1 is a diagrammatic view in cross-section of a spherical mirror system;

Figs. 2, 3a, 3b and 4 refer to the first form of embodiment;

Figs. 5, 6 and 7 are concerned with the second form of embodiment;

Figs. 8, 9a, 9b, and 10 have reference to the third form of embodiment.

First example

The most simple element which fulfills the conditions laid down above is a sheet of air, or more generally a sheet of a material which is less refractive than the medium traversed by the beam which diverges from the object towards the large mirror of the mirror system. To this end, the space in front of the system of mirrors should be filled, at least in part, by a medium having an index $n$ in the vicinity of 1.5, inside which is placed the less refractive sheet, for example a sheet of air.

Figure 2:
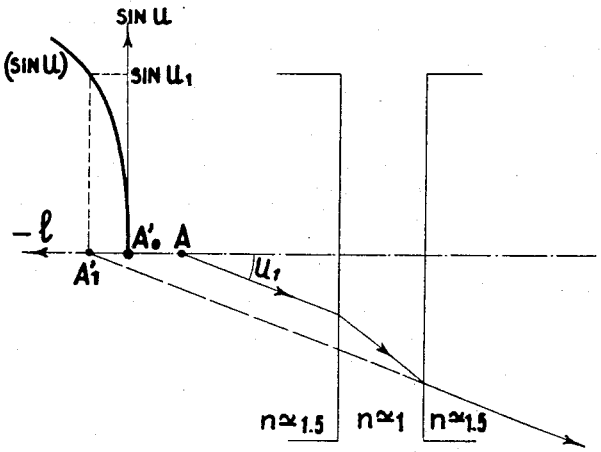

The diagram given in Fig. 2 represents the formation of the aberrant image of a point A by a flat and parallel sheet of air separating the two media with an index of about 1.5.

Figure 3B:
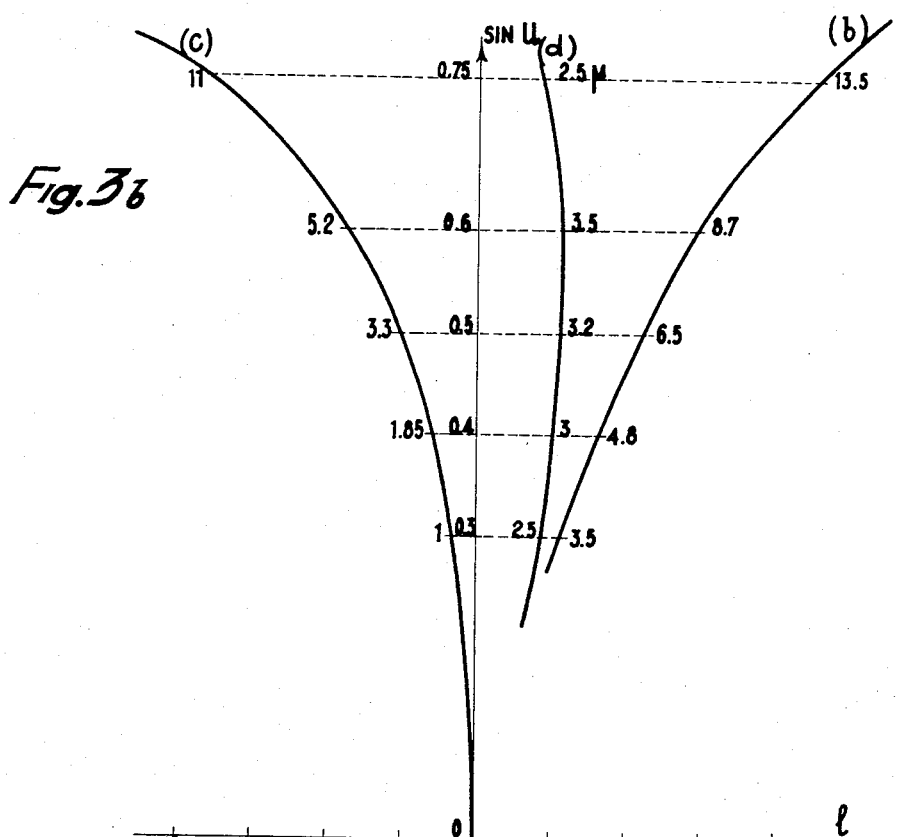
Figure 3A:
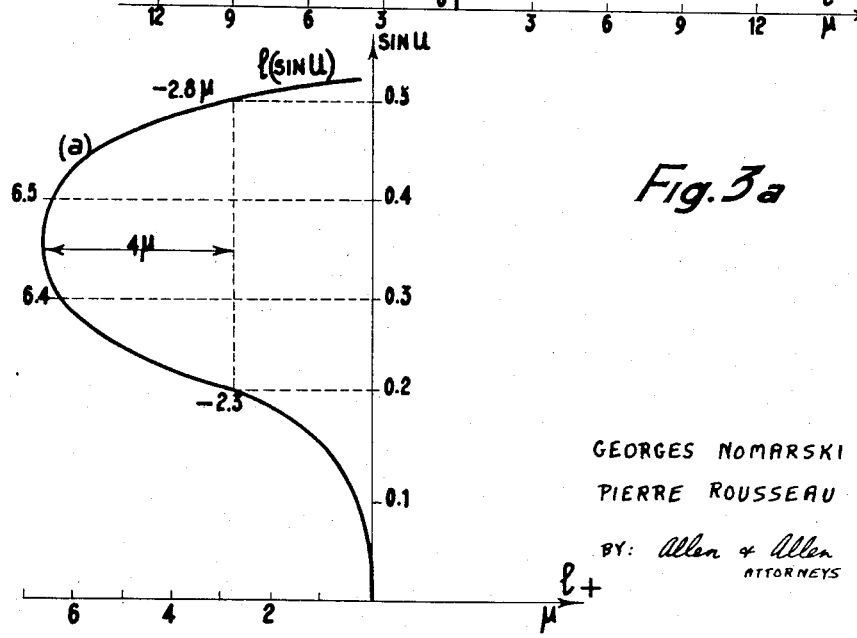

In Figs. 3a and 3b, the various curves of spherical aberrations have been assembled together to demonstrate the efficacy of the method; the curve (a) of Fig. 3a corresponds to a mirror objective having an opening sin $U=0.50$ and has a focal length of 8 mm. Its characteristics are as follows:

$R = -20.85$ mm.
$r = 7.86$ mm.
Magnification $= -31$.

The curves (b), (c) and (d) of Fig. 3b represent respectively:

Curve (b) the spherical aberration of a mirror objective with characteristics as follows:

$R = -22.8$ mm.
$r = 7.86$ mm.

Magnification $g = \dfrac{\sin U}{\sin U'} = -32$.

Curve (c) the spherical aberration of the sheet of air of thickness $e = 23\mu$, and Curve (d) the spherical aberration resulting from the combination of the sheet of air (curve (c)), and of the objective with two mirrors (curve (b)).

Figure 4:
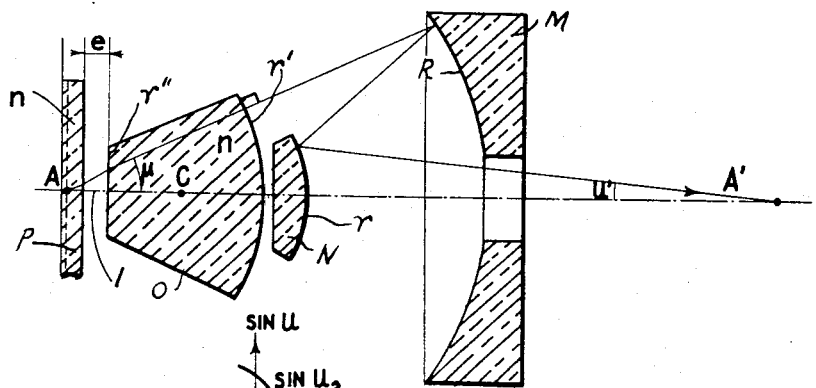

Fig. 4 shows the arrangement diagram of a microscope objective employing this example of the method of application of the invention. Its effective numerical aperture is equal to 0.75 although the angle U is of the order of 30°. The correcting sheet of air 1 of thickness $e$ enables at the same time immersion to be dispensed with.

The belly of the resultant curve (d) only attains one micron instead of four microns which is the maximum of the curve (a). This value of one micron is entirely negligible and shows that an objective of this kind has remarkable qualities from the point of view of spherical aberration.

Second example

Figs. 5, 6 and 7 relate to a second form of embodiment, also very simple, in which the additional corrective element is a plano-convex lens 2 (see Fig. 7) through which passes a beam having a large angular aperture, the lens being placed in front of the mirror objective and having its characteristics determined in such manner that the curve of spherical aberration of the lens 2 has a bellied form for the aperture equal to the maximum aperture of the objective, and that its belly is approximately equal and of opposite sign to that of the curve of aberration of the mirror objective with which this element is associated.

Fig. 5 shows the action of a lens of this type on a beam which is divergent from a point A.

If it is desired to act on the zonal aberration of an objective which has already been corrected, the radius, the thickness and the distance which separate the lens from the point A are chosen in such manner that the curve of spherical aberration is bellied for the value of the angle of opening equal to that of the maximum aperture of the objective. At this moment, the belly of the spherical aberration of the lens is situated on the side of over-correction, and this ensures its compensating effect, since the belly of the curve of spherical aberration of a system of mirrors is always on the side of under-correction.

In Fig. 6, there have been shown together the three curves illustrating the use of this corrector element. The curves (a), (b) and (c) represent respectively:

Curve (a), the spherical aberration of a mirror objective of the type described in French Patent No. 1,101,615. The characteristic features of this objective are as follows:

$r_1 = -7.63$
$r_2 = -8.70$ $\Big\} 1.07 - n_D = 1.47$ $R = -20.85$
$r = 8.70$
sin $U = 0.50$ Curve (b), the spherical aberration of the plano-convex lens, the characteristics of which are as follows:

$d = 4.312$
$r_1 = \infty$
$r_2 = -110$ $\Big\} 1.95 - n_D = 1.52$

Curve (c), the resulting spherical aberration; the curve is bellied in two places and the errors are very greatly reduced.

Fig. 7 shows the diagrammatic arrangement of an objective in accordance with the above form of embodiment, and which can be used with advantage for microscopy at high temperatures. The corrector element may be produced in the form of two separate elements: the first is a plano-convex lens 2 fixed to the objective, and the second is a sheet 2' with parallel faces which plays the part of a window for the hot chamber. This permits of the use of a corrected objective for an object which is not covered by an object-covering sheet.

The reduction of the zonal aberration enables the focal length of the objective, that is to say the ratio $f$, to be increased without thereby exceeding the permissible tolerances for the maximum value of the spherical aberration. This is of particular interest in the chosen example of application, in which a large frontal distance is necessary.

Third example

The third example is more specially concerned with the case of production of optical mirror systems having a very large numerical aperture. As has been previously stated, it is extremely difficult to exceed the opening sin $U = 0.5$, which, in immersion, gives $n$ sin $U = 0.75$, and does not enable magnifications of 750 to be usefully exceeded by direct vision.

Figure 8:
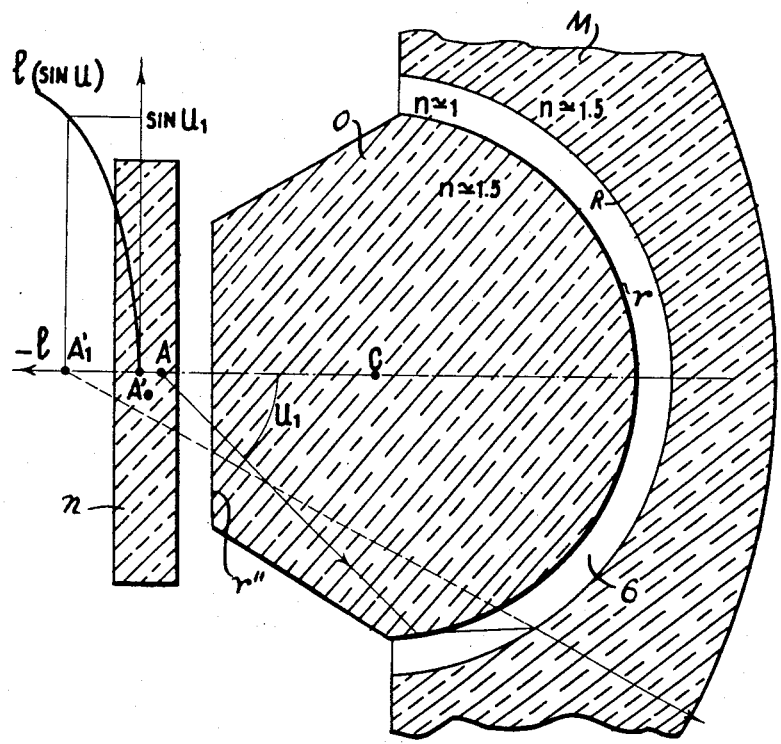
Figure 9B:
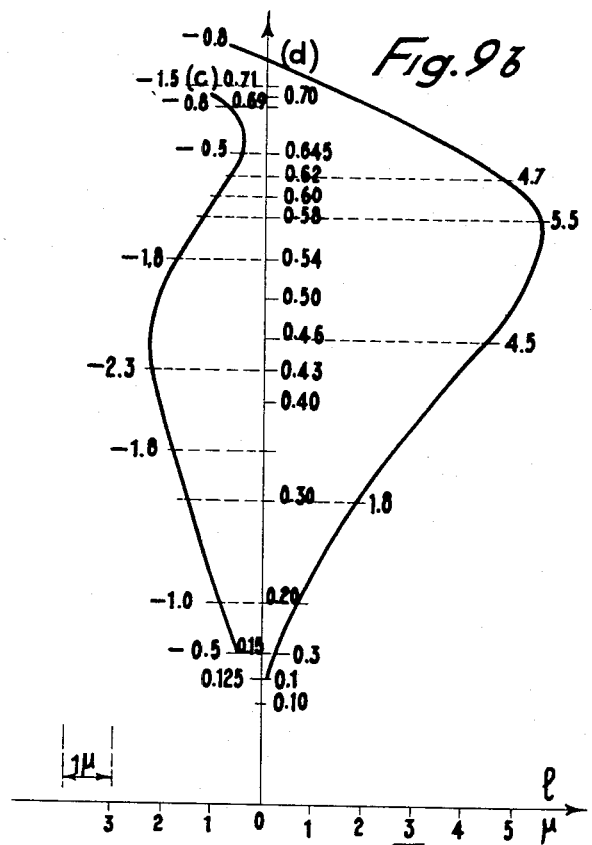
Figure 10:
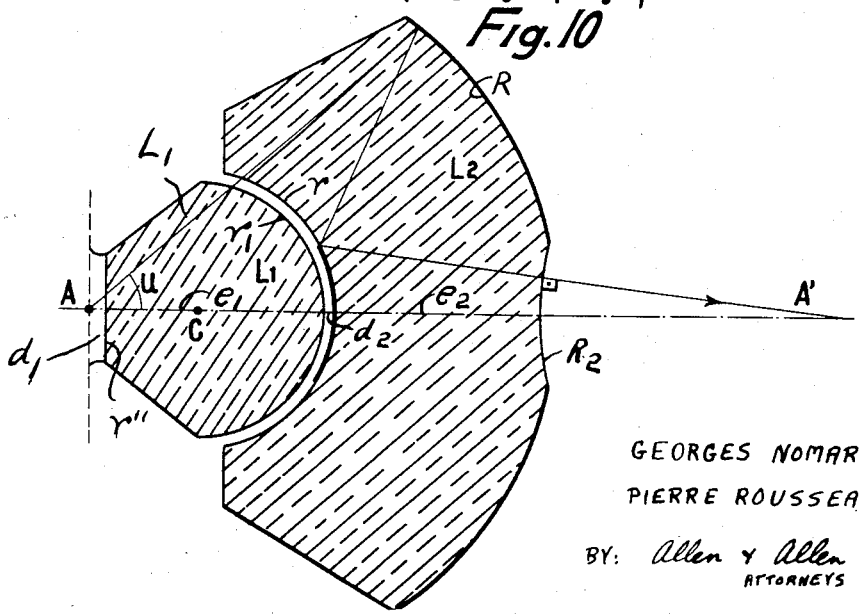

Figs. 8, 9 and 10 illustrate an alternative form of the invention which enables mirror objectives to be obtained, the numerical aperture of which exceeds 1 in immersion. Fig. 8 shows the action on a beam of a meniscus of air 6 formed between two concentric dioptric systems.

Figs. 9a and 9b show a series of spherical aberration curves which illustrate the results obtained as compared with those supplied by an objective of known type.

The curve (a) represents the spherical aberration of an objective having an aperture sin $U = 0.7$. This objective, for which the ratio K has been determined by use of the formula given above, has for example the following characteristics:

$R = -13.4$ mm.
$r = 5.24$ mm.
$f = 4.3$ mm.
$g = 43$.

while $K = \dfrac{-R}{r} = 2.564$.

The zonal aberration, equal to 13 microns for a focal length in air of about 4 mm., practically prohibits the use of this objective.

The curve (b) corresponds to an objective derived from the first, but using a meniscus of quartz as a support for the secondary mirror.

Its characteristics are, in mm.:

$$\text{meniscus: } \begin{pmatrix} r_1 = 4.24 \\ R_2 = -5.24 \end{pmatrix} 1 - n_D = 1.47$$

large mirror: $R = 11.07$
small mirror: $r = 5.24$.

The belly of the aberration curve has increased still further since it now reaches 33 microns, which is due to the presence of the divergent meniscus of silica.

If now the optical media are inverted, that is to say if the air is replaced by the silica for example, and the silica by air, which can readily be effected by forming a meniscus of air in the interior of a solid system, a very large reduction of the zonal aberration is obtained.

The curve (c) of Fig. 9b gives an idea of the effect obtained by means of a meniscus of thickness 0.1: about $\frac{1}{40}$ of the focal length in air. The errors shown by the curve are of the order of $\pm 1.5$ microns which enables objectives of very high quality to be constructed with the aid of this type of corrector system.

It will be noted that the correction does not destroy the perfect symmetry of the objective which remains a mono-centric system.

Fig. 10 shows diagrammatically the possible construction of a system of this kind. It is composed of two members of silica: a plano-convex lens $L_1$ which is almost a half-ball and a thick meniscus $L_2$ with concentric surfaces which serve as supports for the two mirrors of the reflecting system; a dioptric system concentric with respect to the point image A' provides the passage of the rays in air from this solid immersion system.

The characteristics of this system in mm. are as follows:

$$\begin{matrix} r_1 = 5.14 \\ r_2 = 5.24 \end{matrix} 0.10 - \text{air}$$

$R = -14.4$ $r = 524.$

In this latter case, the ratio $K_2$ is 3.07.

The two examples show that the thickness of the meniscus of air must be determined with care. In order to find the correct value of the thickness of the meniscus, it is useful to take as a guide the difference between the value $K_0$ relative to a corrected system having no additional corrector element, and the value K of the same system with a corrector element. This difference $$\Delta K = K - K_0$$

in the examples chosen is 0.19 for the correctly established objective (curve (c), Fig. 9b with two bellies), and 0.51 for the over-corrected objective. Thus for the aperture and the magnification considered, good values for $\Delta K$ are located in the vicinity of 0.2 and are certainly less than 0.5.

It will be noted in addition that in the first case, the power of the corrector element alone is 1.75 and in the second case six diopters.

What we claim is:

1. A catadioptric system comprising in axial alignment a catoptric member formed of a plurality of spherical mirrors and a refractive corrector member of low power compared to that of the catoptric member, the said refractive corrector member being positioned in front of the catoptric member between the object and the said catoptric member, the said catoptric member comprising a spherical concave mirror and a small secondary spherical convex mirror axially spaced therefrom, both mirrors having a common center, and corrected for two conjugate points, the spherical convex mirror being positioned adjacent the refractive corrector member and facing the spherical concave mirror on the longer conjugate side of the catadioptric system towards the image plane, said refractive corrector member having at least one spherical surface, the characteristics of the refractive corrector member being such that its spherical aberration curve exhibits variations of substantially the same magnitude and of opposite sign to the variations of the spherical aberration curve of the spherical mirrors of the catoptric member, whereby the zonal spherical aberration of the combined system of spherical mirrors and refractive corrector member is reduced.

2. A system according to claim 1, in which the corrector member is constituted by a layer of air located between two spaced apart transparent bodies, the refractive index of the material from which said transparent bodies are formed being of the order of 1.5.

3. A system according to claim 2, in which the corrector member is constituted by a meniscus of air in the interior of a solid system composed of quartz and the like.

4. A system according to claim 1, in which the corrector member is a plano-convex lens located between the object and the mirror system with its convex side facing the mirror system.

5. A system according to claim 1, in which the corrector member is formed of a combination of two separate optical elements.

6. A system according to claim 1, in which the corrector member comprises a plano-convex lens and a plate with parallel plane faces.

7. A system according to claim 1, in which the mirror system comprises at least two spherical mirrors and the corrector member comprises a plano-convex lens of substantially hemispherical form associated with a thick meniscus having concentric surfaces serving as supports for the two mirrors of the reflecting system, the passage in air of the light beam from the system to the point at which the image is formed being effected by means of a dioptric system concentric with the point image.

References Cited in the file of this patent

UNITED STATES PATENTS

| | | |
|---|---|---|
| 2,336,379 | Warmisham | Dec. 7, 1943 |
| 2,380,887 | Warmisham | July 31, 1945 |
| 2,380,888 | Warmisham | July 31, 1945 |
| 2,520,633 | Grey | Aug. 29, 1950 |
| 2,520,635 | Grey | Aug. 29, 1950 |
| 2,571,657 | Bennett | Oct. 16, 1951 |
| 2,576,011 | Grey | Nov. 20, 1951 |
| 2,656,761 | Blaisse | Oct. 27, 1953 |
| 2,683,393 | Drew | July 13, 1954 |
| 2,684,015 | Grey | July 20, 1954 |
| 2,707,417 | Bouwers et al. | May 3, 1955 |
| 2,785,604 | Blaisse et al. | Mar. 19, 1957 |

FOREIGN PATENTS

| | | |
|---|---|---|
| 680,221 | Great Britain | Oct. 1, 1952 |
| 1,089,520 | France | Oct. 6, 1954 |
| 1,101,615 | France | Apr. 27, 1955 |